United States Patent
McDonald et al.

(10) Patent No.: US 11,110,987 B2
(45) Date of Patent: Sep. 7, 2021

(54) CHAINSTAY PROTECTOR WITH SPACED PROTRUSIONS

(71) Applicant: Specialized Bicycle Components, Inc., Morgan Hill, CA (US)

(72) Inventors: Ryan James McDonald, Cupertino, CA (US); Jason Scott McDonald, San Jose, CA (US); James Michael Stafford, Gilroy, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 183 days.

(21) Appl. No.: 16/381,220

(22) Filed: Apr. 11, 2019

(65) Prior Publication Data

US 2019/0315427 A1 Oct. 17, 2019

Related U.S. Application Data

(60) Provisional application No. 62/657,467, filed on Apr. 13, 2018.

(51) Int. Cl.
*B62K 19/44* (2006.01)
*B62K 25/30* (2006.01)

(52) U.S. Cl.
CPC .............. *B62K 19/44* (2013.01); *B62K 25/30* (2013.01)

(58) Field of Classification Search
CPC ...... B62K 19/44; B62K 25/30; B62K 25/286; B62K 25/32; B62J 13/00; B62J 23/00

(Continued)

(56) References Cited

U.S. PATENT DOCUMENTS 4,786,071 A * 11/1988 Nagano .................... B62J 13/00
280/304.3
5,242,332 A * 9/1993 Douhairet ............... F16G 5/166
474/146

(Continued)

FOREIGN PATENT DOCUMENTS

| DE | 3629463 A1 * | 3/1988 | .............. B62J 13/00 |
| DE | 202014102807 U1 | 9/2015 | |
| EP | 1623916 A1 * | 3/2006 | .............. B62J 13/00 |

OTHER PUBLICATIONS

Rose Bikes, "CSIXX Chainstay Protector", <https://www.rosebikes.co.uk/article/csixx-chainstay-protector/aid:563006>, web page publicly available at least as early as Aug. 15, 2014.

(Continued)

*Primary Examiner* — Ruth Ilan
*Assistant Examiner* — Myles A Harris
(74) *Attorney, Agent, or Firm* — Michael Best & Friedrich LLP

(57) ABSTRACT

A bicycle includes a chainstay protector having an upper surface including a valley, a first peak, and a second peak. The first peak extends upwardly from the valley toward the chain and has a first contact surface positioned to contact the chain a first height above the valley. The second peak extends upwardly from the valley toward the chain and has a second contact surface positioned to contact the chain a second height above the valley. The first contact surface is spaced from the second contact surface by a gap that is at least 5 times the first height. Each of the first and second contact surfaces has a length that is less than the length of the gap and less than two times a pitch of the chain.

20 Claims, 8 Drawing Sheets

(58) Field of Classification Search
USPC .................. 280/304.3, 288, 284; 474/144
See application file for complete search history.

(56) References Cited

U.S. PATENT DOCUMENTS

| | | | |
|---|---|---|---|
| 5,397,275 A | | 3/1995 | McJunkin, Jr. |
| 5,460,396 A | * | 10/1995 | Sutter .................... B62K 25/30 |
| | | | 280/261 |
| D445,532 S | | 7/2001 | Larson |
| 6,588,110 B2 | * | 7/2003 | Galster .................. B27B 17/02 |
| | | | 30/382 |
| 7,388,151 B2 | | 6/2008 | Nishimoto |
| 7,708,662 B2 | * | 5/2010 | Uchiyama ................ F16H 7/18 |
| | | | 474/144 |
| 8,132,824 B2 | | 6/2012 | Sloan |
| 8,534,693 B2 | | 9/2013 | Sloan |
| 9,469,379 B2 | * | 10/2016 | McGarry ................ F16H 7/18 |
| D774,992 S | * | 12/2016 | Hill .............................. D12/127 |
| 10,294,851 B2 | * | 5/2019 | Doveri ..................... F01P 7/10 |
| 10,683,050 B2 | * | 6/2020 | McGriskin .............. B62J 23/00 |
| 2005/0009652 A1 | * | 1/2005 | Chen ....................... B62J 23/00 |
| | | | 474/144 |
| 2007/0035106 A1 | * | 2/2007 | Thorpe .................. B62K 25/32 |
| | | | 280/260 |
| 2007/0265121 A1 | | 11/2007 | Gross |
| 2009/0295120 A1 | * | 12/2009 | Sloan ..................... B62K 19/44 |
| | | | 280/274 |
| 2012/0090747 A1 | | 4/2012 | Bodine |
| 2019/0233046 A1 | * | 8/2019 | McDonald ............. B62K 25/10 |

OTHER PUBLICATIONS

Westbrook Cycles, "Scott Chain Stay Protector Scale 2012-2016", <https://www.westbrookcycles.co.uk/scott-chain-stay-protector-scale-2012-2016-p193933>, web page accessed Oct. 16, 2017.
Westbrook Cycles, "Scott Cs Neoprene Tpu Chainstay Protector for Gambler", <https://www.westbrookcycles.co.uk/scott-cs-neoprene-tpu-chainstay-protector-for-gambler-p258394>, web page accessed Oct. 16, 2017.
Barrett, "First Look: 2018 Trek Slash 9.7," <https://web.archive.org/web/20180104185818/https:/singletrackworld.com/2017/11/first-look-2018-trek-slash-9-7/> web page publicly available at least as early as Nov. 21, 2017.
Levitch, "An all-new Occam from Orbea for 2018," <https://www.bikeradar.com/news/an-all-new-occam-from-orbea-for-2018/> web page publicly available at least as early as Jul. 14, 2017.

* cited by examiner

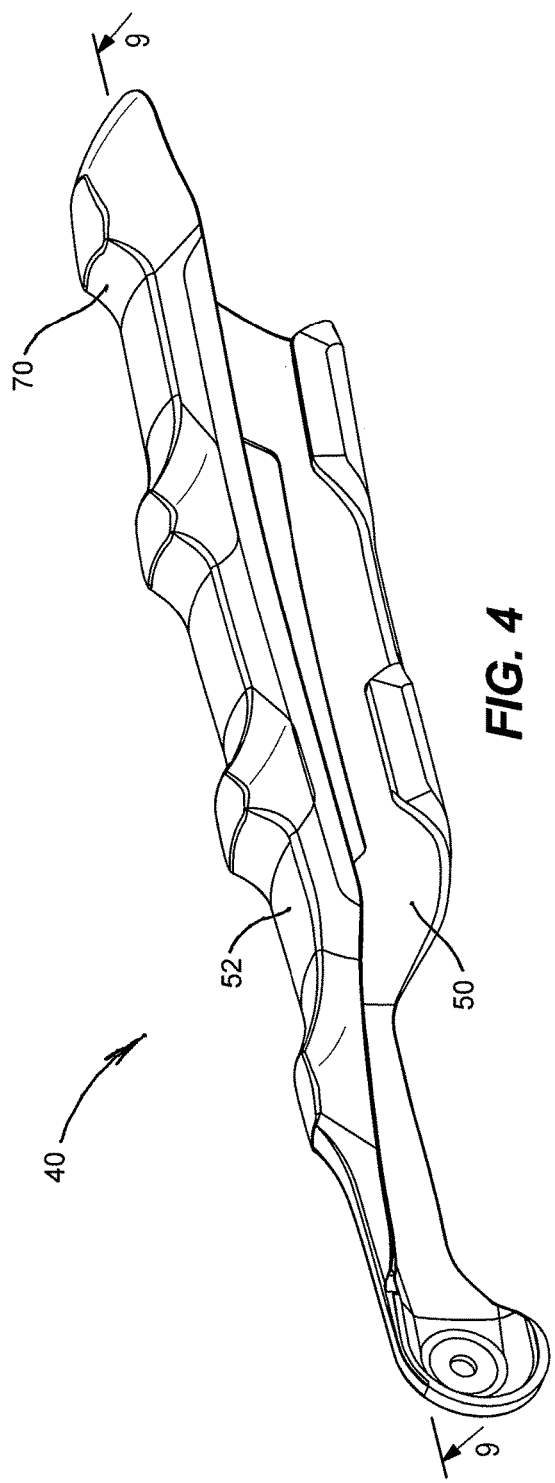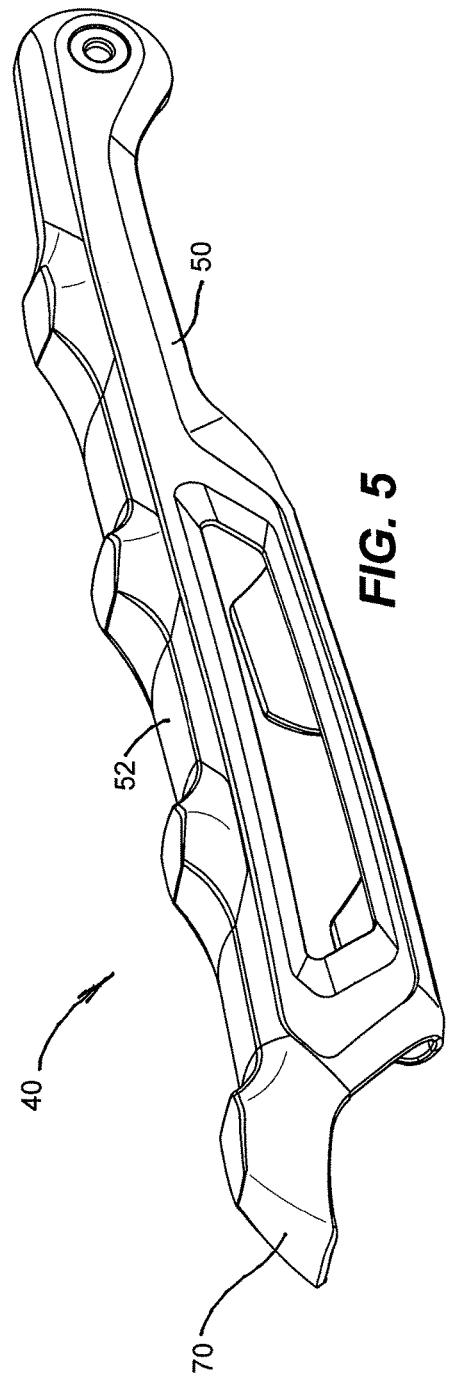
FIG. 4
FIG. 5

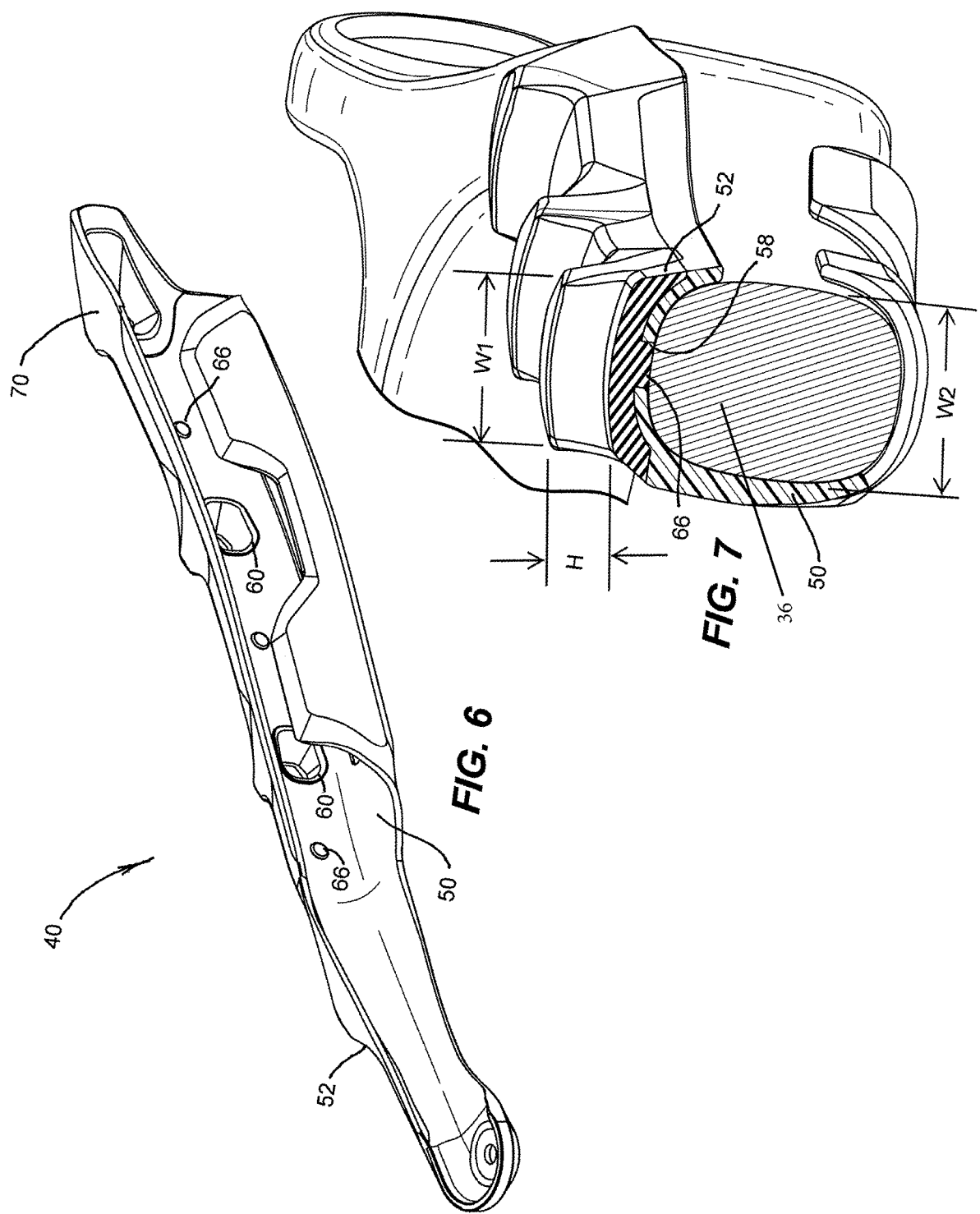

CHAINSTAY PROTECTOR WITH SPACED PROTRUSIONS

CROSS-REFERENCE TO RELATED APPLICATIONS

This application claims priority to U.S. Provisional Application No. 62/657,467, filed Apr. 13, 2018, the entire contents of which are incorporated herein by reference.

BACKGROUND

The present invention relates to bicycle chainstay protectors.

Riding a bicycle over an uneven terrain often causes the chain of the bicycle to oscillate vertically from its static position. In some situations, the upper leg of the chain will contact the chainstay.

In order to inhibit damage to the chainstay caused by contact with the chain, and vice versa, bicycles commonly include chainstay protectors. Chainstay protectors typically comprise a metallic or plastic layer that is secured (e.g., clamped, fastened or adhered) to the chainstay in the area immediately above or below the chain.

As the bicycle is ridden over uneven terrain, the chain will move vertically and contact the chainstay protector, usually resulting in a loud slapping sound. This slapping sound can be undesirable, so it would be beneficial if the volume of that sound could be reduced.

SUMMARY

The present invention provides a bicycle comprising front and rear wheels, a chain adapted to transfer power to the rear wheel, and a frame supported by the front and rear wheels. The frame includes a chainstay protector having an upper surface positioned below the chain. The upper surface includes a valley, a first peak, and a second peak. Third and fourth peaks also can be provided, but the total number of peaks can be less than eight. The first peak extends upwardly from the valley toward the chain and has a first contact surface positioned to contact the chain a first height above the valley. The second peak extends upwardly from the valley toward the chain and has a second contact surface positioned to contact the chain a second height above the valley. The first contact surface can be spaced from the second contact surface by a gap that is at least 5 times the first height, and can be greater than or equal to approximately 8 times and less than or equal to approximately 20 times the first height or greater than or equal to approximately 10 times and less than or equal to approximately 12 times the first height. Each of the first and second contact surfaces can have a length that is less than the length of the gap and less than two times a pitch of the chain.

In one embodiment, the chainstay protector is mounted on a chainstay member of the frame, and the chainstay protector comprises a base portion comprising a first material, and an upper portion secured to the base portion and defining part of the upper surface. The upper portion comprises a second material that is more resilient than the first material. The base portion includes a first opening aligned with the first peak, and a first pad of second material extends through the first opening and contacts the chainstay member. The base portion also can include a second opening aligned between the first and second peaks, and a second pad of second material extends through the second opening and contacts the chainstay member.

In another embodiment, the chainstay protector comprises a nose portion on a front end of the chainstay protector. The nose portion is made of the resilient second material and does not include the first material of the base portion. The nose portion has a nose length that is at least approximately 5% or at least approximately 10%, of the overall length of the chainstay protector.

In another embodiment, a bicycle includes front and rear wheels, a chain adapted to transfer power to the rear wheel, the chain having a pitch, and a frame supported by the front and rear wheels, the frame including a chainstay protector having an upper surface positioned below the chain. The upper surface includes a valley, a first peak extending upwardly from the valley toward the chain and having a first contact surface positioned to contact the chain a first height above the valley, and a second peak extending upwardly from the valley toward the chain and having a second contact surface positioned to contact the chain a second height above the valley. The first contact surface is spaced from the second contact surface by a gap that is at least 5 times the first height.

In another embodiment, a chainstay protector is adapted to be mounted on a chainstay member of a bicycle and to be contacted by a chain of the bicycle. The chainstay protector includes an upper surface adapted to be positioned below the chain. The upper surface includes a valley, a first peak extending upwardly from the valley toward the chain and having a first contact surface positioned to contact the chain a first height above the valley, and a second peak extending upwardly from the valley toward the chain and having a second contact surface positioned to contact the chain a second height above the valley. The first contact surface is spaced from the second contact surface by a gap that is at least 5 times the first height.

Other aspects of the invention will become apparent by consideration of the detailed description and accompanying drawings.

BRIEF DESCRIPTION OF THE DRAWINGS

FIG. 4 is an upper rear perspective view of the chainstay protector of FIG. 3.

FIG. 5 is an upper front perspective view of the chainstay protector of FIG. 3.

FIG. 6 is a lower rear perspective view of the chainstay protector of FIG. 3.

FIG. 7 is a section view taken along line 7-7 in FIG. 2.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
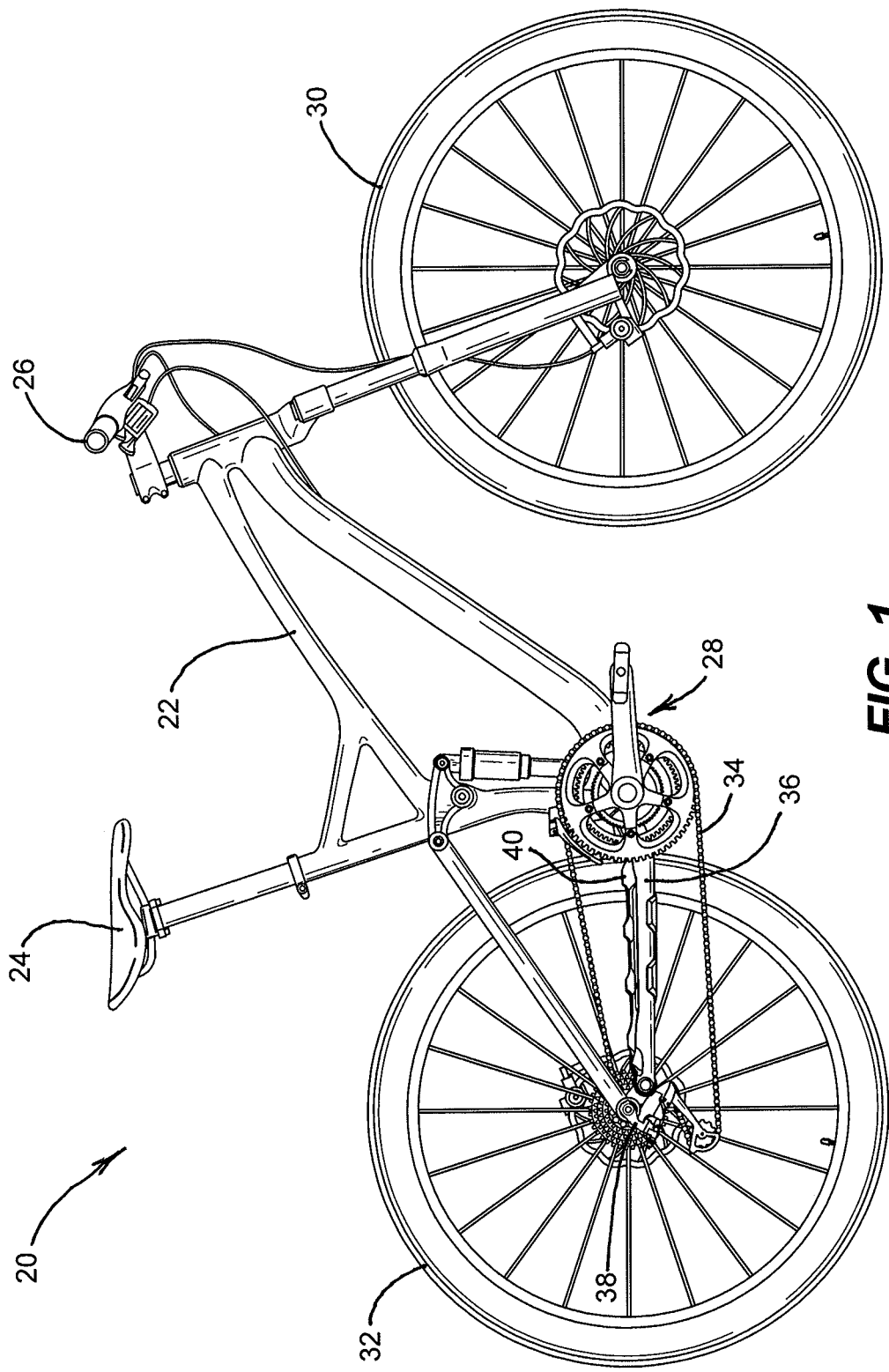
FIG. 1 is a side view of a bicycle having a chainstay assembly embodying the present invention.

FIG. 1 illustrates a bicycle 20 including a frame 22, a saddle 24 for supporting the rider, handlebars 26 for steering the bicycle 20, a crank assembly 28 for pedaling the bicycle 20, and front and rear wheels 30,32 supporting the frame 22. A chain 34 connects the crank assembly 28 to the rear wheel 32 to transfer power to the rear wheel 32.

The frame 22 is supported by the front and rear wheels 30,32 and includes a chainstay member 36 connected between the portion of the frame 22 supporting the crank assembly 28 and a rear wheel support 38. A chainstay protector 40 is secured (e.g., removably secured) to the chainstay member 36 to protect the chainstay member 36 from damage from impact by the chain 34, and vice versa, and to reduce the noise associated with such impact.

Although bicycle 20 is illustrated as a human-powered bicycle without motorized assistance, in other embodiments, bicycle 20 can be implemented as a motor-assisted bicycle, such as, for example, an electric bicycle (e.g., a pedal-assist electric bicycle).

Figure 2:
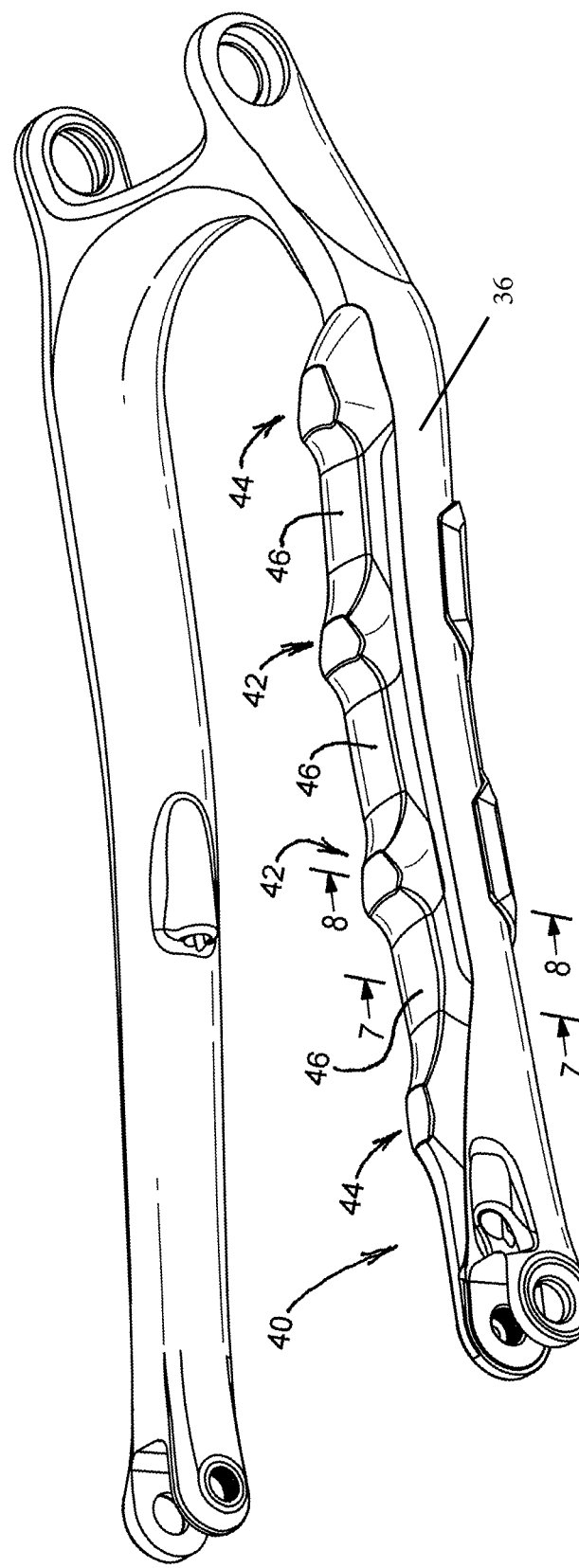
FIG. 2 is a perspective view of the chainstay assembly of FIG. 1.
Figure 3:
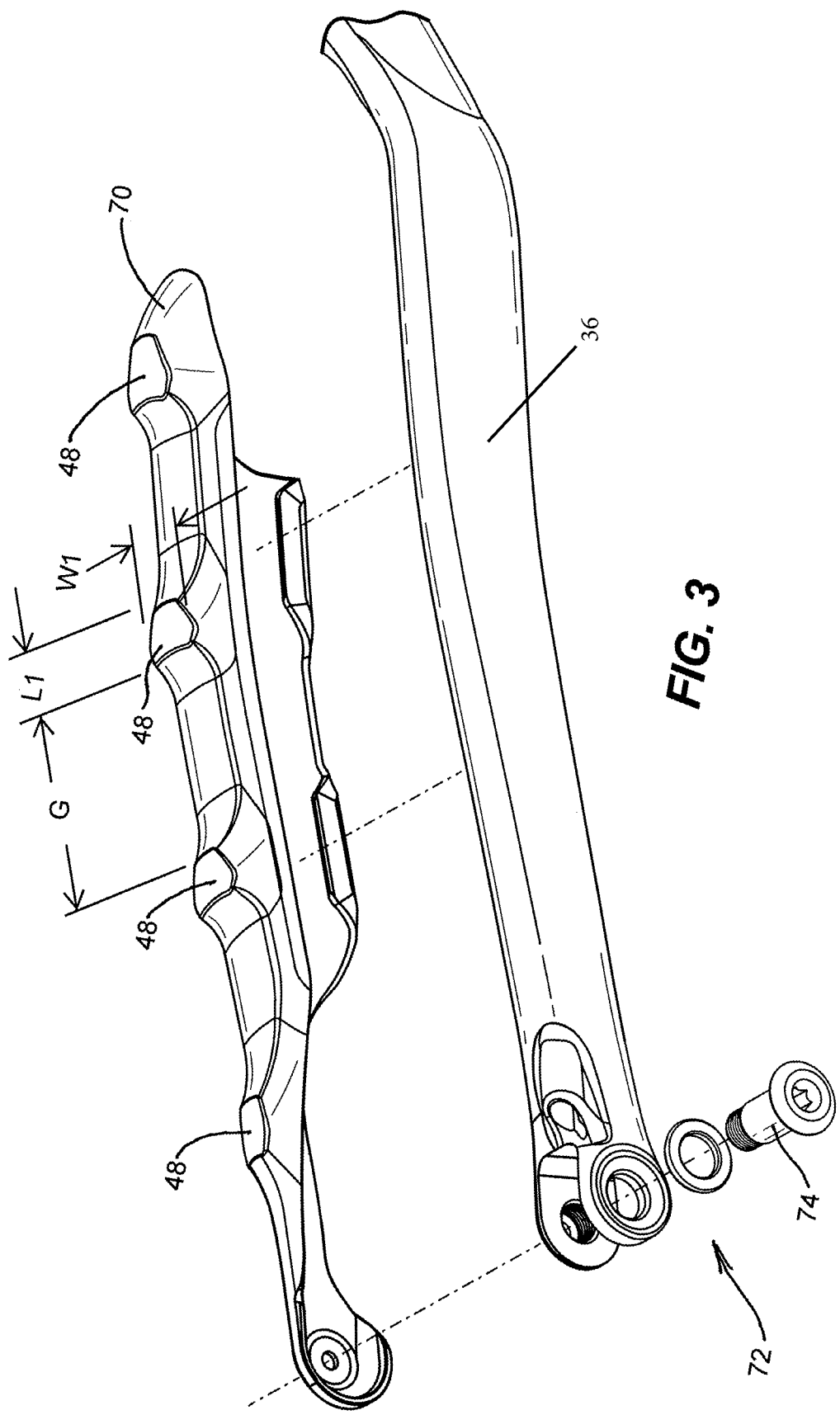
FIG. 3 is an exploded view of the chainstay assembly of FIG. 2 including a chainstay member and a chainstay protector.

Referring to FIG. 2, the chainstay protector 40 defines an upper surface below the chain 34 and adapted to be contacted by the chain 34. The upper surface includes a plurality of protrusions formed by hollow peaks (two central peaks 42 and two end peaks 44) extending upwardly from intermediate valleys 46. Referring to FIG. 3, each peak 42,44 has a contact surface 48 (i.e., the uppermost, flat surface of the peaks) positioned to contact the chain 34. In the illustrated embodiment, the contact surfaces 48 have a length L1 of approximately 12 millimeters. A width W1 of the contact surfaces 48 is approximately 16 millimeters for the front three peaks and about 10 millimeters for the rear peak 44. In other embodiments, different values and/or ranges can be implemented for the lengths L1 and/or widths W1 of contact surfaces 48. In further embodiments, two or more of lengths L1 of contact surfaces 48 and/or two or more of widths W1 of contact surfaces 48 can be different from each other or the same as each other.

Referring to FIG. 7, the peaks 42,44 each have a height H of about 5 millimeters and are spaced from adjacent peaks by a gap G (FIG. 3) of approximately 55 millimeters. In some embodiments, no other portion of the chainstay protector 40 is positioned directly between the contact surfaces 48 of adjacent peaks 42, 44. In other embodiments, different values and/or ranges can be implemented for the heights H of the peaks 42,44, and/or gaps G between peaks 42,44. In further embodiments, two or more of the heights H of the peaks 42,44 and/or two or more of the gaps G between peaks 42,44 can be different from each other or the same as each other.

It has been found that the precise dimensions of the chainstay protector 40 and the peaks can vary depending on the length of the chainstay member 36 being protected. For example, as a length of the chainstay member 36 increases, a larger number of peaks may be implemented to achieve a desirable result. It has further been found that the gap G between adjacent peaks can vary depending on the height H of the peaks. As the height H is increased, the gap G may be increased. For example, the ratio of the gap G to the height H can be greater than or equal to approximately 5:1 and less than or equal to approximately 20:1, and in further examples, greater than or equal to approximately 8:1 and less than or equal to approximately 15:1. In the illustrated embodiment, the ratio is approximately 11:1. In further embodiments, the ratio of the gap G to the height H can be greater than or equal to approximately 5:1, 8:1, or 10:1. In these or other embodiments, the ratio of the gap G to the height H can be less than 12:1, 15:1, or 20:1.

It has also been found that the length L1 of the contact surfaces 48 can be positioned below a link length of the chain 34 in order to effectively dissipate the kinetic energy of the chain 34. For example, with a standard bicycle chain implemented for chain 34 having a link length of approximately 25.4 millimeters (corresponding to a pitch P (FIG. 10) between rollers of chain 34 of approximately 12.7 millimeters), the illustrated embodiment has a contact surface 48 with a length L1 of approximately 12 millimeters. For example, in these or other embodiments, the length L1 of the contact surface 48 can be less than or equal to approximately one or two times the pitch P of chain 34.

The width W1 of the contact surfaces 48 also can vary and can be primarily based on the width of the chainstay member 36 being protected. For example, in the illustrated embodiment, the chainstay member 36 has a width W2 (FIG. 7) of approximately 20 millimeters and the width W1 of each of the front three contact surfaces 48 is approximately 16 mm, or approximately 80% of the width W2 of the chainstay member 36. The rearmost peak 44 can have a contact surface with a width W2 that is substantially less due to the reduced exposure of that portion of the chainstay member 36 to contact with the chain 34. Other embodiments can include different values and ranges of values for the widths W1, W2, as well as different ratios of the widths W1, W2 than that illustrated.

Figure 8:
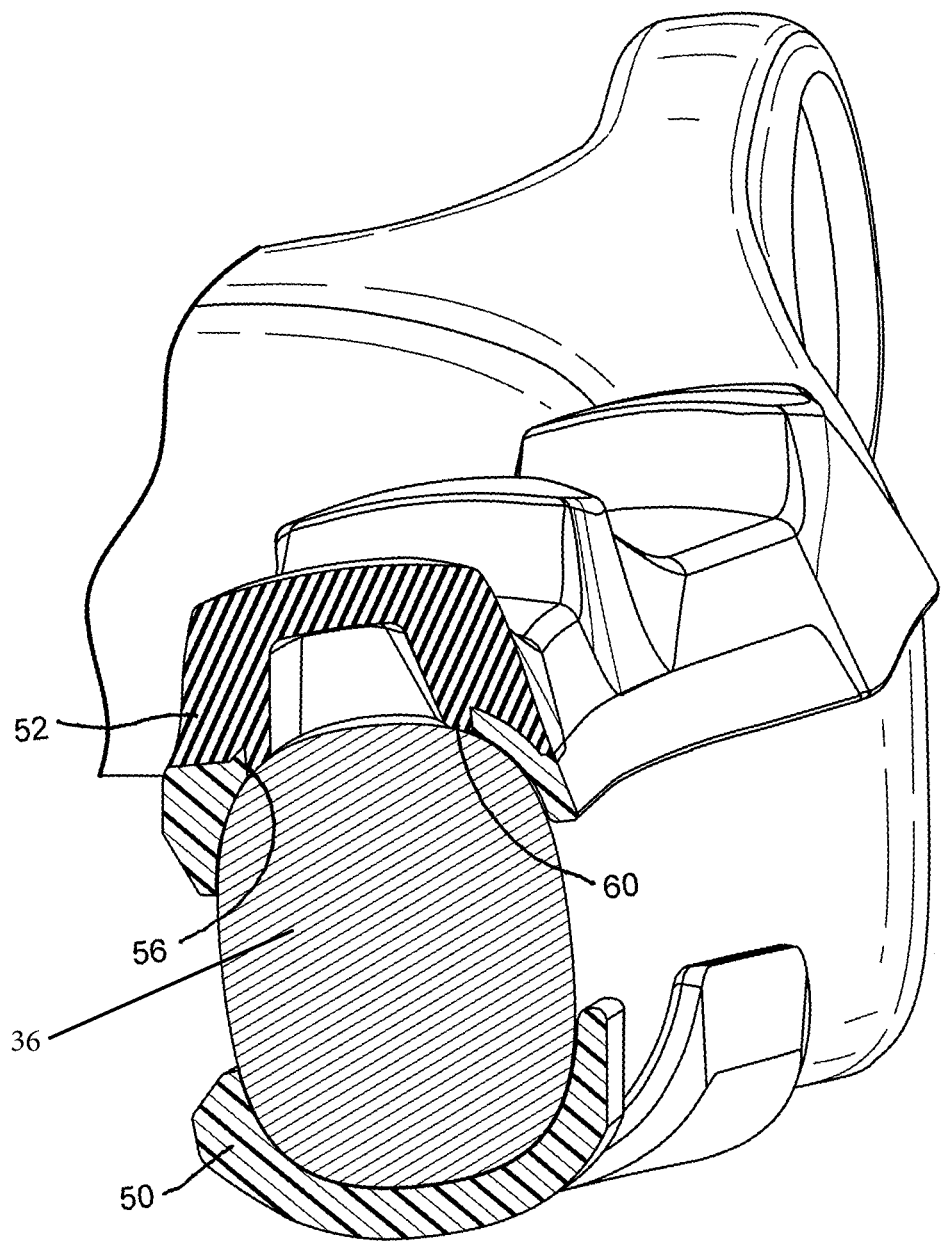
FIG. 8 is a section view taken along line 8-8 in FIG. 2.

Referring to FIGS. 4-8, the illustrated chainstay protector 40 is made from a base portion 50 and an upper portion 52 co-molded to the base portion 50. The base portion 50 comprises a first material. For example, the first material can comprise a glass-filled polymer, such as nylon or polypropylene, that provides stiffness to the chainstay protector 40. Further, the upper portion 52 comprises a second material. The second material can be different than the first material. For example, the second material can comprise a thermoplastic rubber or polymer that provides a more resilient surface for contact by the chain 34. In the illustrated embodiment, the upper portion 52 defines substantially the entire (e.g., most or a majority of) upper surface to be contacted by the chain 34, thereby providing a more resilient and quieter impact with the chain 34. In other embodiments the base portion 50 is attached to the upper portion 52 other than through co-molding (e.g., via a fastener, snap fit-arrangement, etc.). As illustrated in FIGS. 7 and 8, in some embodiments, a portion of the base portion 50 at least partially wraps around or otherwise extends alongside and below a portion of the chainstay member 36, while the upper portion 52 remains generally above the chainstay member 36.

In order to further quiet the chain impact, in the illustrated embodiment the base portion 50 includes multiple openings 56, 58 (FIGS. 7 and 8) through which the second material of the upper portion 52 is positioned to contact the chainstay member 36. More specifically, referring to FIGS. 7-9, the base portion 50 includes first openings 56 aligned with the two central peaks 42 and second openings 58 aligned with the three valleys 46 between the four peaks 42, 44. The first openings 56 are relatively large and provide a path for the resilient second material to pass through the base portion 50 to create first pads 60 (FIG. 8) under the central peaks 42. These first pads 60 each can include a bottom surface 62 (FIG. 9) that extends beyond the inner surface 64 of the base portion 50 to create an interference fit with the chainstay member 36 so that contact between the chainstay protector 40 and the chainstay member 36 is provided primarily by the resilient second material to thereby absorb impact from the chain 34 and inhibit the amount of noise from the impact. In other embodiments, openings 56 and/or openings 58 can be omitted.

The second openings 58 can be smaller than the first openings 56 and provide a path for the resilient second material to pass through the base portion 50 to create second pads 66 (FIG. 7) under the three valleys 46 between the peaks 42,44. These second pads 66 each can include a bottom surface 68 (FIG. 9) that extends beyond the inner surface 64 of the base portion 50 to create an interference fit with the chainstay member 36 so that contact between the chainstay protector 40 and the chainstay member 36 is provided primarily by the resilient second material to thereby absorb impact from the chain 34 and inhibit the amount of noise from the impact.

Figure 9:
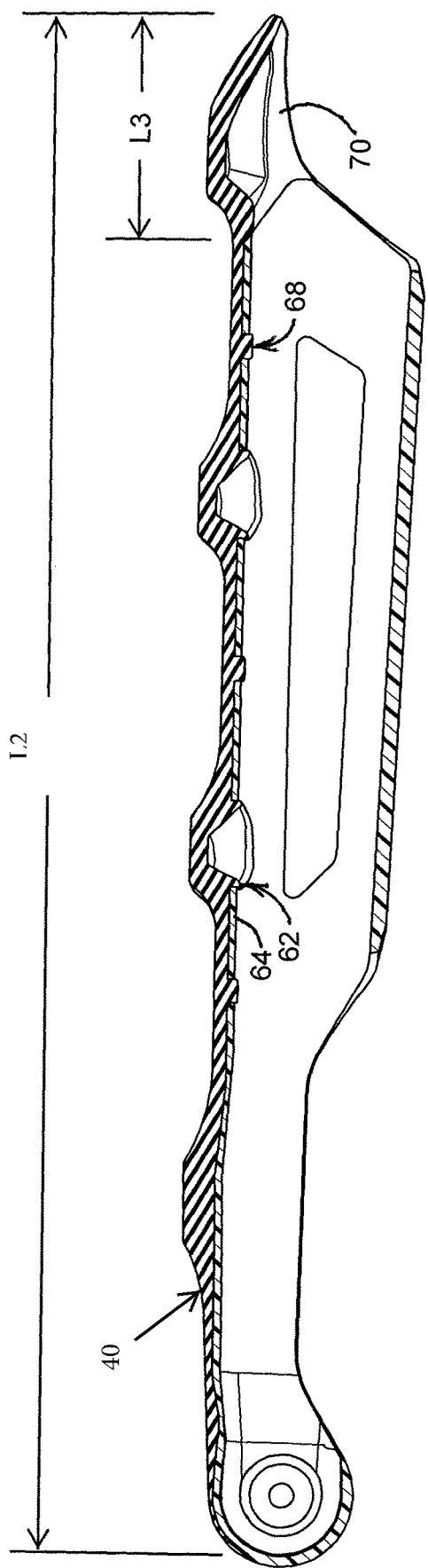
FIG. 9 is a section view taken along line 9-9 in FIG. 4.

As illustrated in FIG. 9, in the illustrated embodiment the chainstay protector 40 has an overall length L2 of about 305 millimeters, and comprises a nose portion 70 with a length L3 of about 35 millimeters on a front end of the chainstay protector 40. Other embodiments include various other values and ranges for the lengths L2, L3. The base portion 50 of the chainstay protector 40 can stop short of and not extend to the nose portion 70, and therefore the nose portion 70 can be made of the resilient second material and not the stiffer first material of the base portion 50. This provides a nose portion 70 that is very resilient and can resiliently conform to variations in the shape of the chainstay member 36. For example, if the chainstay member 36 has a weld bead across its surface being covered by the chainstay protector 40, the resilient nose portion 70 can flex to conform to the weld bead to provide a functional and aesthetically pleasing interface between the chainstay protector 40 and the chainstay member 36. In some embodiments, the nose portion 70 has a nose length L3 that is at least approximately 5% of the overall length L2. In other embodiments, length L3 can be at least approximately 10% of the overall length L2.

The illustrated chainstay protector 40 is resilient and is designed with an interference fit with the chainstay member 36 to facilitate resilient engagement with the chainstay member 36. In addition, referring to FIG. 3, the chainstay protector 40 is fastened to the frame at a pivot point on the frame, in this case a Horst pivot 72 between the chainstay member 36 and a rear wheel support 38 (FIG. 1). Specifically, and as illustrated in FIG. 3, the Horst pivot 72 is provided by a pivot bolt 74, and the chainstay protector 40 is fastened to the pivot bolt 74 by a protector bolt (not shown) threaded into the pivot bolt 74.

Figure 10:
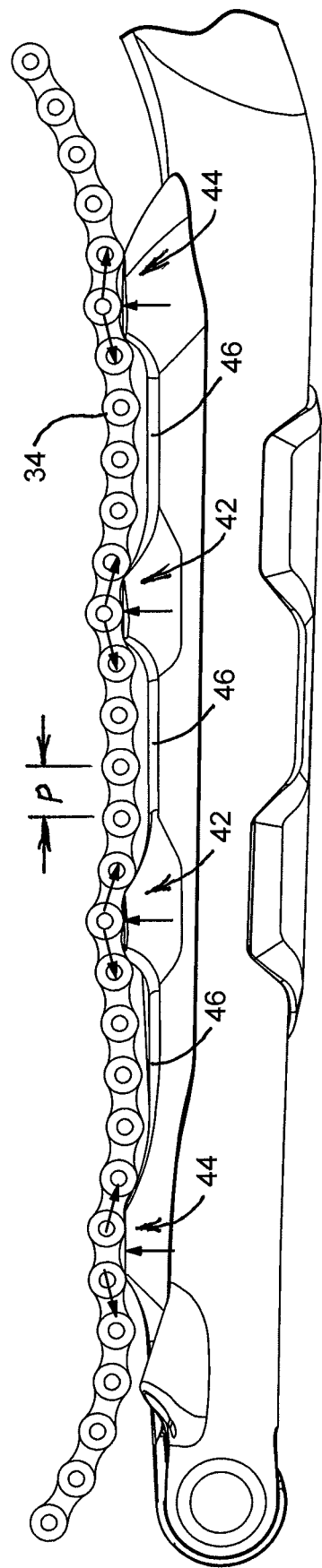
FIG. 10 is side view of the chainstay assembly being contacted by a chain.

In operation, and referring to FIG. 10, when the chain 34 deflects downward, the chain 34 will first contact one or more of the peaks 42,44. After this initial contact, the kinetic energy of the chain 34 will be slowly dissipated as the chain 34 pivots around the peaks 42,44, thereby substantially reducing the downward speed of the chain 34 gradually rather than suddenly. The result is a less severe impact between the chain 34 and the chainstay protector 40, which reduces the amount of noise generated by the impact. In many embodiments, the height and spacing of the peaks 42,44 can be configured to prevent or substantially limit contact between the chain 34 and the valleys 46 of the chainstay protector 40.

While the chainstay protector 40 has been described and illustrated as extending over and/or contacting the chainstay member 36, in other embodiments the chainstay protector 40 may extend over and/or contact other components (e.g., frame members) of the bicycle 20. For example, the bicycle 20 may include a frame member that extends below or above at least a portion of the chain 34, and may be susceptible to being contacted by the chain 34. The chainstay protector 40 may therefore be coupled to such a frame member, for example in the same manner as described above with respect to the chainstay member 36, so that the chain 34 does not contact the frame member, and so that a volume level is reduced.

Various features and advantages of the invention are set forth in the following claims.

The invention claimed is:

1. A bicycle comprising:
   a front wheel and a rear wheel;
   a chain adapted to transfer power to the rear wheel, the chain having a pitch; and
   a frame supported by the front wheel and the rear wheel, the frame including a chainstay protector having an upper surface positioned below the chain, the upper surface including:
      a valley;
      a first peak extending upwardly from the valley toward the chain and having a first contact surface positioned to contact the chain a first height above the valley; and
      a second peak extending upwardly from the valley toward the chain and having a second contact surface positioned to contact the chain a second height above the valley, the first contact surface being spaced from the second contact surface by a gap that is at least 5 times the first height.

2. A bicycle as claimed in claim 1, wherein there is no other portion of the upper surface directly between the first contact surface and the second contact surface.

3. A bicycle as claimed in claim 1, wherein each of the first contact surface and the second contact surface has a length that is less than two times the pitch of the chain.

4. A bicycle as claimed in claim 1, wherein each of the first contact surface and the second contact surface has a length that is less than the gap.

5. A bicycle as claimed in claim 1, wherein the gap is greater than or equal to approximately 8 times and less than or equal to approximately 20 times the first height.

6. A bicycle as claimed in claim 1, wherein the gap is greater than or equal to approximately 10 times and less than or equal to approximately 12 times the first height.

7. A bicycle as claimed in claim 1, wherein the chainstay protector is mounted on a chainstay member of the frame, and wherein the chainstay protector comprises:
   a base portion comprising a first material; and
   an upper portion secured to the base portion and defining part of the upper surface, the upper portion comprising a second material that is more resilient than the first material, wherein the base portion comprises a first opening aligned with the first peak, and wherein a first pad of the second material extends through the first opening and contacts the chainstay member.

8. A bicycle as claimed in claim 7, wherein the base portion comprises a second opening aligned between the first peak and the second peak, and wherein a second pad of the second material extends through the second opening and contacts the chainstay member.

9. A bicycle as claimed in claim 7, wherein the chainstay protector has an overall length and comprises a nose portion on a front end of the chainstay protector, the nose portion not including the first material of the base portion, the nose portion having a nose length that is at least approximately 5% of the overall length.

10. A bicycle as claimed in claim 1, wherein the chainstay protector further comprises:
- a third peak extending upwardly from the valley toward the chain and having a third contact surface positioned to contact the chain a third height above the valley, the third contact surface being spaced from the second contact surface by a second gap that is at least 5 times the second height; and
- a fourth peak extending upwardly from the valley toward the chain and having a fourth contact surface positioned to contact the chain a fourth height above the valley, the fourth contact surface being spaced from the third contact surface by a third gap that is at least 5 times the third height, and wherein the chainstay protector comprises fewer than eight peaks.

11. A chainstay protector adapted to be mounted on a chainstay member of a bicycle and to be contacted by a chain of the bicycle, the chainstay protector comprising an upper surface adapted to be positioned below the chain, the upper surface including:
- a valley;
- a first peak extending upwardly from the valley toward the chain and having a first contact surface positioned to contact the chain a first height above the valley; and
- a second peak extending upwardly from the valley toward the chain and having a second contact surface positioned to contact the chain a second height above the valley, the first contact surface being spaced from the second contact surface by a gap that is at least 5 times the first height.

12. A chainstay protector as claimed in claim 11, wherein there is no other portion of the upper surface directly between the first contact surface and the second contact surface.

13. A chainstay protector as claimed in claim 11, wherein each of the first contact surface and the second contact surface has a length that is less than two times the pitch of the chain.

14. A chainstay protector as claimed in claim 11, wherein each of the first contact surface and the second contact surface has a length that is less than the gap.

15. A chainstay protector as claimed in claim 11, wherein the gap is greater than or equal to approximately 8 times and less than or equal to approximately 20 times the first height.

16. A chainstay protector as claimed in claim 11, wherein the gap is greater than or equal to approximately 10 times and less than or equal to approximately 12 times the first height.

17. A chainstay protector as claimed in claim 11, wherein the chainstay protector further comprises:
- a third peak extending upwardly from the valley toward the chain and having a third contact surface positioned to contact the chain a third height above the valley, the third contact surface being spaced from the second contact surface by a second gap that is at least 5 times the second height; and
- a fourth peak extending upwardly from the valley toward the chain and having a fourth contact surface positioned to contact the chain a fourth height above the valley, the fourth contact surface being spaced from the third contact surface by a third gap that is at least 5 times the third height, and wherein the chainstay protector comprises fewer than eight peaks.

18. A chainstay protector as claimed in claim 11, wherein the chainstay protector comprises:
- a base portion comprising a first material; and
- an upper portion secured to the base portion and defining part of the upper surface, the upper portion comprising a second material that is more resilient than the first material, wherein the base portion comprises a first opening aligned with the first peak, and wherein a first pad of the second material extends through the first opening and contacts the chainstay member.

19. A chainstay protector as claimed in claim 18, wherein the base portion comprises a second opening aligned between the first peak and a second peak, and wherein a second pad of the second material extends through the second opening and contacts the chainstay member.

20. A chainstay protector as claimed in claim 19, wherein the chainstay protector has an overall length and comprises a nose portion on a front end of the chainstay protector, the nose portion not including the first material of the base portion, the nose portion having a nose length that is at least approximately 5% of the overall length.

* * * * *